July 5, 1938.  F. A. HAYES  2,123,008
POWER TRANSMISSION MECHANISM
Original Filed June 18, 1932
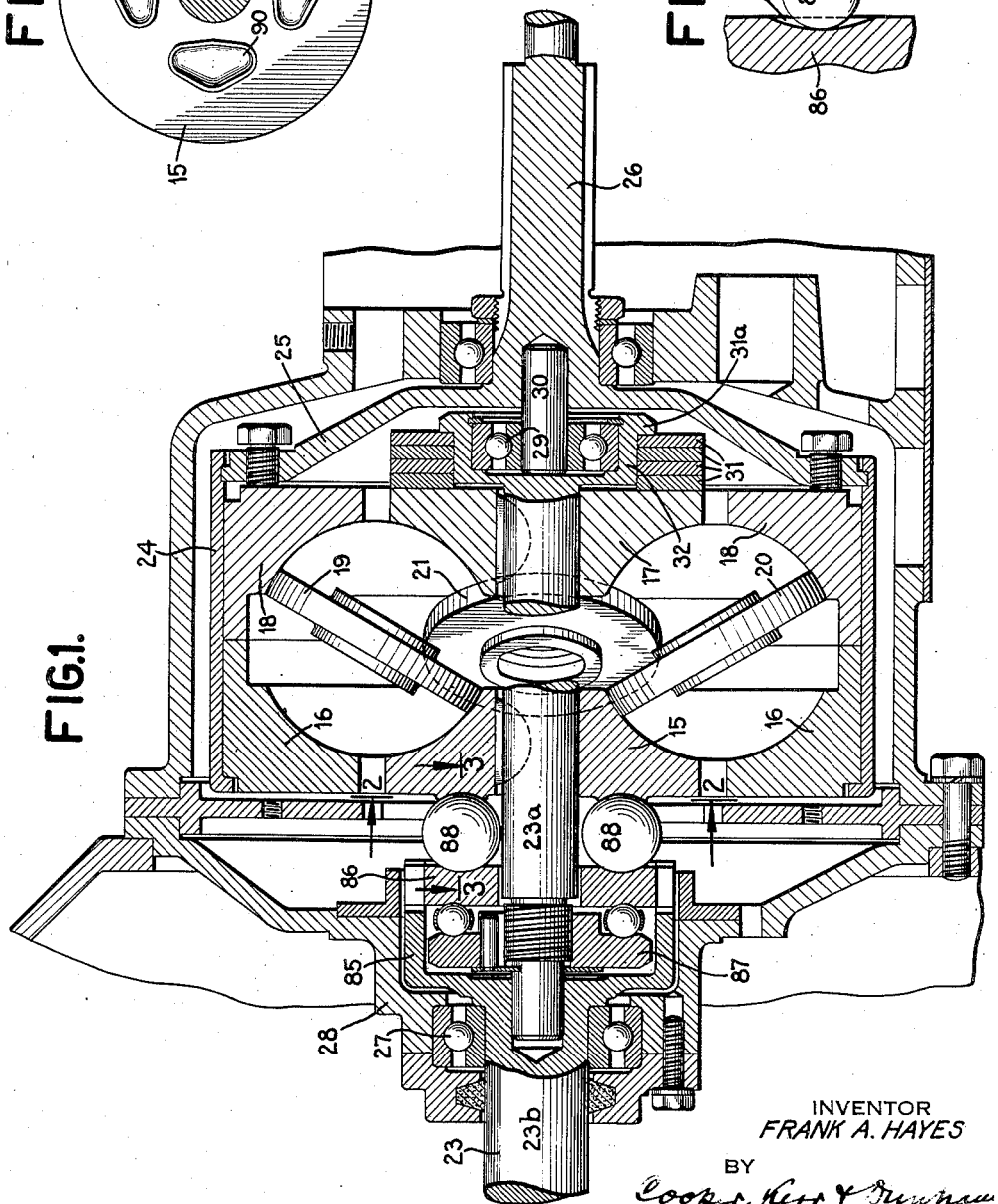
INVENTOR
*FRANK A. HAYES*
BY
*Cooper, Kerr & Dunham*
ATTORNEYS Patented July 5, 1938

2,123,008

UNITED STATES PATENT OFFICE 2,123,008

POWER TRANSMISSION MECHANISM

Frank A. Hayes, Middletown, N. J.

Original application June 18, 1932, Serial No. 618,054. Divided and this application January 21, 1938, Serial No. 186,016. In Great Britain August 19, 1931

11 Claims. (Cl. 74—208)

The invention which forms the subject of my present application (a division of my copending application Serial No. 618,054, filed June 18, 1932) relates to power transmission mechanisms of the friction type, particularly friction transmissions in which power is transmitted from a driving shaft or other member to a driven shaft or other member through the instrumentality of friction disks having toroidal grooves and interposed friction rollers cooperating therewith.

With mechanisms of the type indicated, the amount of power transmissible to the load depends, other things being the same, upon the tractive friction between the rollers and disks, with the result that overload may cause slippage, with resulting wear and damage. This may be obviated by making the pressure of the disks or races on the rollers great enough for the heaviest loads on the mechanism; but in that case the pressure is unnecessarily high for lighter loads, with resulting unnecessarily high stresses and losses. In my prior Patent No. 1,698,229, issued January 9, 1929, I have disclosed a pressure means or device by which the tractive contact pressure of the disks and rollers depends upon the load itself and is thus varied in a desired correspondence therewith. In the mechanism described for the purpose in the patent mentioned, a cam is provided, fixed on the driving shaft, with balls interposed between the cam and the adjacent driving disk, which latter is loose on the driving shaft so as to be capable of slight rotation thereon. Then when, as the load increases, the driving disk lags behind the driving shaft, the rolls will roll into shallower parts of the cam grooves or recesses, thereby causing the disks to exert greater pressure on the cooperating rollers. The mechanism referred to is generally quite suitable in transmission mechanisms in which a single set of rollers is employed or in which a plurality of sets of rollers transmit power in series. However, in mechanisms in which two sets of rollers are in parallel as regards power transmission it is important that the speed-ratio (i. e., angular) positions of the rollers of the two sets be equal. If not, one set of rollers will tend to drive the load at a speed different from that of the other set, with consequent slippage and wear of the contacting surfaces.

The chief object of the present invention is therefore to provide, in a transmission mechanism in which two sets of rollers drive in parallel, a pressure mechanism or device by which tractive pressures can be produced in a desired correspondence with the load without causing any difference in the speed-ratio positions of the sets of rollers. To this and other ends the invention comprises the novel features and combinations hereinafter described.

Referring to the accompanying drawing:

Fig. 1 is a longitudinal section illustrating an embodiment of the invention as applied to a transmission mechanism in which two sets of rollers, driving in parallel, are arranged in the same transverse plane. To avoid unnecessarily complicating the description of the invention I have not shown any means for varying the speed ratio of the transmission mechanism. The preferred means for causing change of speed-ratio position of the rollers by precession is shown in my copending application above identified to which reference may be made for a full disclosure thereof.

Fig. 2 is a detail cross section on the plane indicated by the line 2—2 of Fig. 1.

Fig. 3 is a detail sectional plan view on the plane indicated by the line 3—3 of Fig. 1.

In the drawing, four toroidally grooved disks are shown, designated 15, 16, 17, 18, with interposed rollers 19, 20, 21, of which rollers 19 and 20 constitute one set, the other set being composed of roller 21 and one (not shown) between the observer and the plane of the figure. At one end of the apparatus the two-part shaft 23 is mounted in a ball bearing 27 carried by the casing 28 and its cupped other end is supported by a ball bearing 29 on a stud 30 mounted in the adjoining end of the coaxial shaft 26. Disks or races 15 and 17 are keyed on shaft part 23a and are thus in positive driving connection therewith but capable of relative axial movement thereon, and disks or races 16, 18, having toroidal grooves or raceways, are rigidly fixed together in the encircling drum 24 which is connected by a spider or cone 25 to shaft 26.

Rollers 19, 20 cooperate with disks or raceways 15, 18, and assuming that disk 15 is the driving disk, driven by shaft 23, and assuming also that the rollers can revolve in planetary fashion around the disk axis and that disks 16 and 18 are held stationary or non-rotatable, it will be seen that the rollers will revolve about the disk axis at an angular speed depending, other conditions being constant, upon the angle of the rollers to the disk axis or the planes of the parallel disks. Similarly, if the rollers are non-planetary and disks 16 and 18 rotatable, the latter will be rotated at a speed also depending upon the angular position of the rollers. It will also be clear that disks 16 and 18 may be the driving disks and disks 15 and 17 the driven disks. One or another of the three elements, namely, the race element composed of disks 15—17, the race element composed of disks 16—18, and the roller assembly composed of the two sets of rollers, must be "stationary", that is, must not revolve about the disk axis. The stationary element, whichever it may be, then takes the reaction of the load and accordingly may be conveniently termed the reaction element.

A certain minimum frictional engagement (tractive friction) of the disks and rollers is obtained by one or more spring washers 31 between disk 17 and flange 31a of cup 32 on shaft 23a.

As stated above, the amount of power transmissible to the load depends, other conditions being the same, upon the friction between the rollers and the disks. The friction depends, in turn, upon the pressure of the rollers and disks upon each other. If the pressure is always great enough to prevent slippage at the maximum load imposed on the transmission mechanism it will be greater than necessary at lesser loads, with consequently high frictional losses. Accordingly the present invention provides a novel torque-loading construction or "pressure device" which depends upon the load resistance, increasing as the latter increases, and vice versa, though not necessarily in a strictly linear manner. Further the construction is such that the pressure does not depend upon angular movement of either disk 15 or 17 relative to the other, and hence these disks may be rigidly connected together, as by keying them both to shaft 23a, as shown in Fig. 1.

In the construction illustrated, the inner part 23a of the two-part shaft 23 is journaled at its outer end in the outer part 23b which is equipped with a cup 85 having teeth in its edge cooperating with teeth on the periphery of a cam member or collar 86, rotatable and axially movable relative to shaft part 23a. Threaded on the journal of the latter is a ball thrust bearing 87 to limit leftward movement of cam 86 and between the collar and the adjacent disk 15 are three or more balls 88 working in cam grooves or depressions 89 in the collar (see Figs. 2 and 3) and similar depressions 90 in the disk. Each groove deepens gradually from its ends to its central portion. From study of the construction described it will be seen that as the load on the mechanism increases, the shaft part 23b (shaft 23 being assumed to be the driving shaft) will run ahead of disks 15 and 17, and shaft-part 23a. As this occurs the balls 88 are rolled into shallower parts of the cooperating depressions or recesses 89, 90, thus urging disk 15 toward the right, and cam collar 86 (and with it shaft 23a and disk 17) toward the left, thereby increasing the pressure of disks 15 and 18 on rollers 19, 20, and the pressure of disks 16, 17 on the rollers of the other set, of which one is shown at 21. The friction of these parts on each other is thus increased so that no slip of one on the other can occur. It will be observed that the operation described is entirely automatic. If at any time the load reaction on shaft 23b is decreased the lessened tendency of shaft 23a to lag permits the balls to roll back to deeper parts of the recesses, thereby decreasing the pressure exerted on the disks and rollers. In this way the pressure of the parts on each other is always proportional to the load. It will also be observed that in the action described there is no rotary movement of disk 15 relative to disk 17, or vice versa. This is an advantageous feature, since such relative rotation would cause one set of rollers to tend to drive the driven element at a different rate than the other set, with resulting slip and wear which would sooner or later cause serious damage. It is advantageous to have the pressure-producing mechanism at the driving end of the apparatus but it may be positioned at the other end if desired.

It is to be understood that the invention is not limited to the construction herein specifically illustrated but can be embodied in other forms without departure from its spirit as defined by the appended claims.

I claim:

1. In a power transmission mechanism of the friction disk and roller type, the combination with power-transmitting elements having toroidal raceways one of said elements comprising a shaft and disks mounted thereon to prevent relative angular movement of the disks but permit relative axial movement thereof, and a plurality of sets of rollers cooperating with said raceways; of a shaft coaxial with the first shaft and angularly movable relatively thereto, and a cam-and-bell pressure device associated with said shafts for transmission of power therebetween and production of contact pressure between said friction rollers and raceways.

2. In a power transmission mechanism of the friction disk and roller type, the combination with an element comprising a shaft having coaxial inner and outer parts capable of angular movement relative to each other, and coaxial disks mounted on the inner part of the shaft to prevent relative angular movement of the disks but permit relative axial movement thereof; of means for transmitting power between the outer and inner parts of the shaft and pressing the disks toward each other in accordance with relative angular movement of the parts of the shaft, comprising a cam rotatable in unison with the outer part of the shaft and having cam recesses, and rolling bodies in said cam recesses and in power-transmitting connection with the inner part of the shaft.

3. In a power transmission mechanism, in combination, a driving element, a shaft, coaxial toroidally grooved disks mounted on the shaft to prevent relative angular movement of the disks but permit relative axial movement thereof; a toroidally grooved driven element; a plurality of sets of friction rollers cooperating with the grooves in the driving and driven elements for transmission of power therebetween; a shaft coaxial with the first mentioned shaft and angularly movable relatively thereto; a pressure cam coaxial with said disks and adjacent to one of the same and connected with said coaxial shaft for rotation thereby, the cam having cam recesses; and rolling members cooperating with said cam recesses and with the adjacent disk to vary the pressure on the said adjacent disk in accordance with relative angular movement of said disk and cam.

4. In a power transmission mechanism, in combination, an element having toroidal raceways, an element comprising coaxial disks having toroidal raceways; a shaft on which said disks are mounted to prevent relative angular movement of the disks but permit relative axial movement thereof, one of said disks having cam recesses in its outer face; a plurality of sets of friction rollers cooperating with the said raceways to drive one of said elements from the other; a shaft coaxial with and angularly movable relatively to the first shaft; a pressure cam encircling the axis of said shafts and adjacent to one of the same and connected with the second-mentioned shaft for rotation in unison therewith; the cam having cam recesses; and rolling members cooperating with the recesses in the cam and adjacent disk to vary the pressure on the said adjacent disk in accordance with relative angular movement of said disk and cam caused by variation of load on the transmission mechanism.

5. In a power transmission mechanism, in combination, driving and driven elements having toroidal raceways, one of said elements comprising coaxial disks incapable of angular movement relative to each other but capable of relative axial movement; a plurality of sets of friction rollers cooperating with the raceways for transmission of power between said elements; a shaft coaxial with said disks and angularly movable relatively thereto; a pressure cam coaxial with said disks and adjacent to one of the same and connected with said shaft for rotation in unison therewith, the cam having cam recesses; and rolling members cooperating with said cam recesses and with the adjacent disk to vary the pressure on the said adjacent disk in accordance with relative angular movement of said disk and cam.

6. In a power transmission mechanism, in combination, a driving element, a driven element, and a reaction element, one of said elements comprising toroidally grooved coaxial disks incapable of angular movement relative to each other but capable of relative axial movement, another of said elements being toroidally grooved, and another of said elements comprising a plurality of sets of friction rollers cooperating with the grooves in the other elements; a shaft coaxial with said disks and angularly movable relatively thereto; a pressure cam coaxial with said disks and adjacent to one of the same and connected with said shaft for rotation in unison therewith, the cam having cam recesses; and rolling members cooperating with said cam recesses and with the adjacent disk in accordance with relative angular movement of said disk and cam.

7. In a frictional power transmitting mechanism, in combination, a shaft; two axially spaced coaxial toroidal races in positive driving connection with said shaft but capable of relative axial movement with respect to one another; an independently rotatable toroidal race coaxial with said two races; friction rollers in tractive engagement with said races; a thrust-receiving member on said shaft at one end and outside of the first mentioned races; and torque loading means disposed between the thrust member and the back of one of the first mentioned races and adapted to resolve a limited relative angular movement of the shaft and the torque loading means into two forces one of which is directed axially against the adjacent race.

8. In a frictional power transmitting mechanism, in combination, a shaft; two axially spaced coaxial toroidal races in positve driving connection with said shaft but capable of relative axial movement with respect to one another; an independently rotatable toroidal race coaxial with said two races; friction rollers in tractive engagement with said races; a thrust-receiving member on the shaft and outside of the races; torque loading means disposed between the thrust-receiving member and the back of one of the first mentioned races and adapted to resolve a limited relative angular movement of the shaft and torque loading means into two forces one of which is directed axially against the adjacent race, said means comprising a cam member around the shaft and rolling members cooperating therewith and with the adjacent race; and means for rotating the cam member to drive said axially movable races through said rolling members.

9. In a friction power transmitting mechanism, in combination, a shaft; a second shaft in axial alignment therewith; two toroidal races mounted on the second shaft and incapable of rotational movement relative to each other but capable of relative axial movement; an independently rotatable toroidal race coaxial with the first two; friction rollers in tractive connection with said races; a thrust bearing on the second shaft; torque loading means between the thrust bearing and the back of one of the first mentioned races and adapted to resolve a limited relative angular movement of the shaft and the torque loading means into two forces, one of which is directed axially against the adjacent races; and rotation-transmitting means connecting the first mentioned shaft and the torque loading means.

10. In a frictional power transmitting mechanism, in combination, a shaft; a cup on one end thereof; a second shaft coaxial with the first and having an end extending into the cup; two toroidal races mounted on the second shaft and incapable of rotational movement relative to each other but capable of relative axial movement; a toroidal race coaxial with said axially movable races; friction rollers having tractive engagement with said races; torque loading means outside of the races for converting a limited relative angular movement of the second shaft and the torque loading means into two forces one of which is directed axially against the adjacent race, the torque loading means comprising a cam member connected with said cup, and rolling members cooperating with the cam member and the adjacent race element; and a thrust bearing for the cam member, mounted on the second shaft within said cup on the first shaft.

11. In a frictional power transmitting mechanism, in combination, a shaft; a cup on an end thereof; a second shaft coaxial with the first and extending into the cup, a cam collar concentric with the second shaft and releasably connected with the cup for transmission of rotation therebetween; a thrust bearing mounted on the second shaft within the cup to cooperate with said cam collar; coaxial races concentric with the second shaft and incapable of angular movement relative to each other but capable of relative axial movement; an independently rotatable race coaxial with the first mentioned races; friction rollers in tractive engagement with the races; and rolling bodies between the cam collar and the adjacent race for conversion of relative angular movement of the cam collar and the adjacent race into two forces one of which is directed axially against said adjacent race.

FRANK A. HAYES.